US012589407B2

(12) United States Patent
Peng et al.

(10) Patent No.: US 12,589,407 B2
(45) Date of Patent: Mar. 31, 2026

(54) APPLICATORS FOR HIGH VISCOSITY MATERIALS

(71) Applicant: PRC-Desoto International, Inc., Sylmar, CA (US)

(72) Inventors: Shane Xiufeng Peng, Valencia, CA (US); Yong Han Yeong, Valley Village, CA (US); Dillon Schiff, Philadelphia, PA (US); Bruce Virnelson, Huntersville, NC (US)

(73) Assignee: PRC-DeSoto International, Inc., Sylmar (CA)

(*) Notice: Subject to any disclaimer, the term of this patent is extended or adjusted under 35 U.S.C. 154(b) by 0 days.

(21) Appl. No.: 18/687,334

(22) PCT Filed: Sep. 1, 2022

(86) PCT No.: PCT/US2022/075803
§ 371 (c)(1),
(2) Date: Feb. 28, 2024

(87) PCT Pub. No.: WO2023/034890
PCT Pub. Date: Mar. 9, 2023

(65) Prior Publication Data

US 2025/0121400 A1 Apr. 17, 2025

Related U.S. Application Data

(60) Provisional application No. 63/240,115, filed on Sep. 2, 2021.

(51) Int. Cl.

| | |
|---|---|
| ***B05C 5/02*** | (2006.01) |
| ***B05D 1/26*** | (2006.01) |
| ***B05D 1/28*** | (2006.01) |
| ***B05D 7/24*** | (2006.01) |

(52) U.S. Cl.
CPC ............ *B05C 5/0254* (2013.01); *B05D 1/265* (2013.01); *B05D 1/28* (2013.01); *B05D 7/24* (2013.01)

(58) Field of Classification Search
None
See application file for complete search history.

(56) References Cited

U.S. PATENT DOCUMENTS

| | | | | |
|---|---|---|---|---|
| 3,537,617 A * | 11/1970 | Mendola | A61C 5/62 | 222/340 |
| 2003/0165793 A1 * | 9/2003 | Yobel | A61C 5/62 | 433/32 |

(Continued)

FOREIGN PATENT DOCUMENTS

| | | |
|---|---|---|
| DE | 102013219628 A1 | 4/2014 |
| JP | 10-151390 A | 6/1998 |
| KR | 10-2014-0042739 A | 4/2014 |

OTHER PUBLICATIONS

English translation of DE102013219628.*

(Continued)

*Primary Examiner* — Charles Capozzi

(57) ABSTRACT

Coating applicators for applying high viscosity coatings to large area surfaces are disclosed. The coating applicators facilitate the ability to apply high viscosity materials over large areas at high speed with minimal air entrapment to provide coatings having a controlled thickness.

13 Claims, 1 Drawing Sheet

(56) References Cited

U.S. PATENT DOCUMENTS

| | | | | |
|---|---|---|---|---|
| 2011/0027753 | A1 * | 2/2011 | Maurat ................ | A61C 9/0026 433/141 |
| 2013/0279967 | A1 | 10/2013 | Otto | |
| 2015/0367620 | A1 | 12/2015 | DeFillipi | |

OTHER PUBLICATIONS

International Search Report and Written Opinion received for PCT Application Serial No. PCT/US2022/075803 dated Feb. 9, 2023, 17 pages.

* cited by examiner

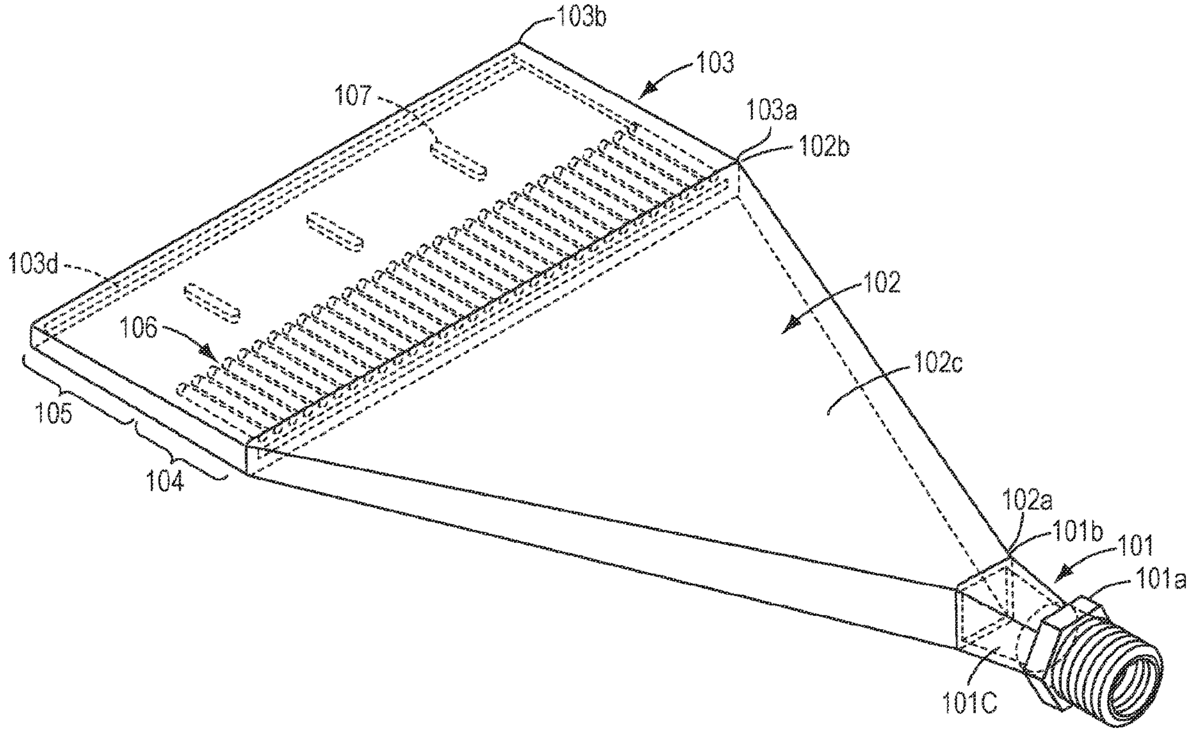
103b
103
107
103a
102b
103d
102
106
102c
105
104
102a
101b
101
101a
101C

APPLICATORS FOR HIGH VISCOSITY MATERIALS

FIELD

The disclosure relates to applicators for high viscosity materials and methods of applying thin layers of high viscosity materials such as sealant barrier coatings. The applicators facilitate the application of high viscosity materials such as sealants over large areas at high speed and with minimal air entrapment to provide thin coatings having a controlled thickness.

BACKGROUND

The application of low-viscosity materials over large surface areas can be achieved by spraying or atomizing and entraining the material in an air flow. This is a highly efficient process for coating large surfaces. However, it is difficult to atomize and spray high viscosity materials. Air entrapment becomes an issue, which adversely affects properties of the cured sealant. Insufficient atomization can result in inadequate control of the thickness and uniformity of the surface coverage. Poor thickness control can affect the thixotropic properties of a surface coating. Solvents and rheological agents can be added to reduce the viscosity. However, use of solvents can increase the volatile organic content (VOC) of the formulation, which can increase the environmental impact and the health risk to application personnel.

Apparatus and methods for applying high-viscosity sealants to large surface areas with high efficiency and which provide coatings having a uniform thickness and coverage with desired aesthetic and functional properties are desired.

SUMMARY

According to the present invention, extrusion applicators comprise: (a) an adaptor section comprising a proximal end and a distal end; (b) a transition section mechanically coupled to the adaptor section, and comprising a proximal end and a distal end, wherein, the transition section defines an internal transition channel comprising a width and a height; the width of the transition channel increases from the transition inlet to the transition outlet; and the height of the transition channel decreases from the transition inlet to the transition outlet; and (c) a nozzle section mechanically coupled to the transition section, and comprising a proximal end, a distal end, and a nozzle outlet, wherein, the nozzle section defines an internal nozzle channel comprising a width and a height; the nozzle channel comprises a flow control section in proximity to the proximal end, and a pressure control section in proximity to the distal end.

According to the present invention, methods of coating a substrate surface comprise: pumping a curable coating composition into the adaptor section of the extrusion applicator according to the present invention, placing the nozzle outlet in proximity to a surface; and moving the nozzle outlet across the surface to apply the curable coating on the surface.

According to the present invention, methods of applying a coating comprise: saturating a foam cover of a roller with a curable coating composition, wherein the roller comprises a cylindrical core; and a foam cover surrounding the core; rolling the saturated foam cover repeatedly across a substrate surface to apply a layer of the curable coating composition to the substrate surface; and curing the applied curable coating composition to provide a cured coating, wherein the curable coating composition is characterized by a viscosity from 1,000 cp to 10,000 cp, wherein viscosity is determined using a Brookfield CAP 2000 viscometer, with a No. 6 spindle, at speed of 300 rpm, and a temperature of 25° C.

BRIEF DESCRIPTION OF THE DRAWINGS

The drawings described herein are for illustration purposes only. The drawings are not intended to limit the scope of the present disclosure.

FIG. 1 shows a perspective view of an extrusion applicator provided by the present disclosure.

DETAILED DESCRIPTION

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Applicators for applying high viscosity materials such as sealants to large surface areas include extrusion applicators and roller applicators. The applicators are capable of applying high viscosity materials over a large surface area at high speed and with a controlled thickness with minimal air entrapment.

Applicators provided by the present disclosure include extrusion applicators. A perspective view of an example of an extrusion application provided by the present disclosure is shown in FIG. 1.

The extrusion applicator shown in FIG. 1 includes an adaptor section 101, a transition section 102, and a nozzle section 103.

The adaptor section 101 connects the applicator to a source of material. Examples of material sources include a material reservoir, a material feeding line, mixing apparatus, or a combination of any of the foregoing. The material source can be provided to the applicator under pressure such as, for example, a pressure from 10 psi to 100 psi. The material source and pumps used to apply the pressure can be closed systems to minimize or prevent air entrapment. The adaptor section can be coupled to the source of a coating composition through a hose which can be secured to the adaptor section using, for example, a threaded or press-fit coupling. Adaptor section 101 includes a proximal end 101*a* and a distal end 101*b*. The walls of the adaptor section define an internal channel 101*c*.

Proximal refers to a relative position of an element that is toward the inlet of the adaptor section, and away from the nozzle outlet. Distal refers to a relative position of an element away from the adaptor inlet and toward the nozzle outlet of the applicator.

Transition section 102 is mechanically coupled to adaptor section 101. The transition section 102 includes a laterally diverging dimension with a longitudinally converging internal dimension. The dimensions of the diverging section can be selected based on the desired coverage area. The converging dimension induces shear in the material. When shear-thinning materials are used, the shear induced by the material flow will reduce the material viscosity, which can facilitate the ability to apply laterally uniform layers of material. The converging dimension can be configured to draw the material to a thickness close to that of the applied material layer thickness.

The transition section 102 has a proximate end 102*a* coupled to the distal end 102*b* of the adaptor section 101*b*. The transition section 102 includes a distal end 102*b* and the walls of the transition section defined an internal channel 102*c*. As shown in FIG. 1 the width or lateral dimension of channel 102*c* increases from the proximal end 102*a* to the distal end 102*b*, and the height of the channel 102*c* decreases from the proximal end 102*a* to the distal end 102*b*.

The nozzle section 103 includes an opening that matches the dimensions of the opening at the distal end 102*b* of the transition section 102. The nozzle section 103 includes a proximal end 103*a* coupled to the distal end 102*b* of the transition section 102. The nozzle section 103 includes a proximal end 103*b* and the walls of the nozzle section 103 define an internal channel 103*c*. The distal end 103*c* of the nozzle section 103 includes a nozzle outlet 103*d*. The nozzle outlet 103*d* can have a height, for example, from 0.1 mm to 10 mm, from 0.2 mm to 8 mm, from 0.5 mm to 6 mm, or from 1 mm to 4 mm. The nozzle outlet can have a height, for example, of less than 15 mm, less than 10 mm, less than 8 mm, less than 6 mm, less than 4 mm, less than 2 mm, or less than 1 mm. The nozzle outlet can have a height, for example, greater than 0.1 mm, greater than 1 mm, greater than 2 mm, greater than 4 mm, greater than 6 mm, greater than 8 mm, or greater than 10 mm. The nozzle outlet 103*d* can have a width, for example, from 25 mm to 500 mm, from 50 mm to 400 mm, or from 100 mm to 300 mm. The nozzle outlet can have a rectangular shape. The nozzle outlet can have a width, for example, less than 500 mm, less than 400 mm, less than 300 mm, less than 200 mm, less than 100 mm, less than 50 mm, less than 40 mm, less than 30 mm, less than 20 mm, or less than 10 mm. The nozzle outlet can have a width, for example, greater than 10 mm, greater than 20 mm, greater than 30 mm, greater than 40 mm, greater than 50 mm, greater than 100 mm, greater than 200 mm, greater than 300 mm, greater than 400 mm, or greater than 500 mm.

The nozzle outlet 103*d* can be adjustable to accommodate different applied material thicknesses. The height, width, or both the height and width of the nozzle outlet 103*d* can be adjustable. The dimensions of nozzle outlet 103*d* can be adjusted automatically or manually.

Nozzle section 103 can have a uniform width such that the width of the internal channel is the same at both the proximal end and at the distal end of the nozzle section 103. The height of the internal channel of the nozzle section can be the same at the proximal end 103*a* and at the distal end 103*b* of the nozzle section 103. The height of the internal channel of the nozzle section can be different at the proximal end 103*a* and at the distal end 103*b* of the nozzle section 103.

The nozzle section 103 can include a flow control section 104 and a pressure control section 105. The flow control section 104 can be in proximity to the distal end 102*b* of transition section 102. The pressure control section 105 can extend from the flow control section 104 to the distal end 103*b* of nozzle section 103.

The flow control section 104 can be configured to provide a laminar flow of a viscous composition throughout the width of the nozzle section. The flow control section 104 can include a plurality of parallel channels. Each of the plurality of parallel channels 106 can have a width, for example, from 1 mm to 10 mm, from 1 mm to 8 mm, from 1 mm to 6 mm, or from 1 mm to 4 mm. The channels can have any suitable cross-sectional profile. For example, a channel can have a square, rectangular, oval, or diamond-shaped crosssectional profile. Each of the plurality of channels can have the same dimensions or at least some of the channels can have a different dimension than other channels. The plurality of parallel channels can extend over the width of the nozzle section 103. The plurality of parallel channels can comprise, for example, from 2 to 100 parallel channels, from 5 to 90 parallel channels, from 10 to 80 parallel channels, or from 20 to 60 parallel channels.

A channel of the plurality of parallel flow control channels can have a cross-sectional profile that is uniform throughout the length of the channel, or the cross-sectional profile can change continuously or discontinuously throughout the length of the channel. For example, the cross-sectional profile can be tapered toward the distal end such as being cone shaped. The plurality of parallel flow control channels can have a length, for example, from 1 mm to 30 mm, from 2 mm to 28 mm, from 5 mm to 25 mm, or from 10 mm to 20 mm.

The channels can be dimensioned and shaped to facilitate uniform flow across the width of the applicator outlet nozzle and/or to provide secondary shear thinning to facilitate application.

Each of the plurality of parallel flow control channels is coupled to the internal channel of the pressure control section 105 of the nozzle section 103. The pressure control section includes a substantially open channel coupling the plurality of parallel flow control channels to the nozzle outlet 103*d*. The channel of the pressure control section can have a constant width. The height of the channel of the pressure control section can be uniform or can be tapered toward the nozzle outlet. The channel of the pressure control section can taper to be wider at the nozzle outlet than at the interface with the flow control section or can be narrower at the nozzle outlet than at the interface with the flow control section.

The applicator pressure control section can include one or more support structures 107. Support structures can provide physical integrity to the nozzle section and to the pressure control section. The support structures can prevent the pressure control section from collapsing and/or from expanding and can help to ensure that a uniform thickness of an applied.

The height of the internal channel of the nozzle section can be the same at the proximal end 103*a* and at the distal end 103*b* of the nozzle section 103 and the thickness of the applied layer can be maintained across the width of the nozzle outlet.

The lateral dimension of the nozzle outlet can be selected depending on the thickness and/or the width of the layer of sealant desired to be applied to a substrate surface.

The height dimension of the exit slit can be selected depending on the thickness of the coating to be applied.

The nozzle section can be designed to be detachable. Interchangeable release sections can be used to apply coatings having different thicknesses and/or different widths.

The nozzle section can be adjustable. For example, the distal end of the nozzle section can be configured such that the dimensions of the nozzle outlet can be manually or automatically adjusted either continuously or discontinuously. Adjustable dimensions can facilitate the ability to change the thickness of an applied material layer on selected regions of a substrate surface.

The extrusion applicator can include a mating section (not shown). The mating section can facilitate coupling between the transition section 102 and the nozzle section 103. The mating section can include mechanisms for detachably coupling the transition and nozzle sections. The mating section can include mechanisms that provide the ability to rotatably adjust the angle between the transition section and the nozzle section.

The transition section and the nozzle section can be configured such that the angle defined at the intersection between the transition section and the nozzle section is adjustable. The connection can be configured such that the angle is continuously adjustable or discontinuously adjustable. The ability to change the angle can facilitate accessing surface areas that would otherwise be difficult to reach with a straight configuration.

An extrusion applicator can include a removable external closure that retains all or a portion of the applicator. The closure can protect the applicator and/or can protect surfaces and the operator from leaks. A closure can be detachable.

An extrusion applicator can be made from any suitable material to serve the intended purpose. For example, the applicator can be made from a thermoplastic, a thermoset, a metal, an alloy, a composite, or a combination of any of the foregoing. The material and thicknesses of the walls of the sections of the applicator can be selected to withstand the extrusion pressure. The nozzle section or the nozzle section in proximity to the nozzle outlet can be flexible. A flexible nozzle section in proximity to the nozzle outlet can facilitate the ability of the nozzle outlet to conform to an underling surface having different curvatures. The nozzle section and the nozzle outlet can be substantially planar or can have curvature or other cross-sectional shape to facilitate the ability of the nozzle outlet to provide a material layer having a uniform thickness on a non-planar surface.

Internal walls of the extrusion applicator that define the internal channels can be coated with a layer of a shear-thinning material. Examples of coatings that facilitate the ability of a viscous curable composition to be extruded by the applicator include fluorocarbon coatings.

One or more sections of an applicator can be heated to facilitate the ability of a viscous curable composition to be extruded by the applicator. An extrusion applicator can be heated using any suitable heating apparatus. For example, thermoelectric heating elements can be applied to one or more exterior surfaces of the applicator such as, for example on the transition section and/or on the release section.

An extrusion applicator can be heated in the release section only, or in proximity to the exit slit and thereby reduce the viscosity of the material immediately before and/or while the material is being applied to a surface. This decrease in viscosity can facilitate the ability to apply a laterally uniform coating having a uniform film thickness.

Slight heating of the external surfaces of the extrusion applicator can also help to facilitate laminar flow of the material through the device.

An extrusion applicator can be a handheld apparatus or may be integrated into a robotic system. For example, an extrusion applicator provided by the present disclosure can be incorporated into an automated system that includes a gantry, a robotic arm, and a processor.

An extrusion applicator can include a flow sensor disposed within one or more of the sections. A flow sensor can be used to control the flow rate of a curable composition through the extrusion applicator. The flow rate can be monitored and can be used to control the thickness of the applied material composition.

A sealant applicator can comprise a roller applicator. For example, certain rollers used to apply coatings can be adapted to apply viscous sealant materials at a high rate over large surface areas with minimal entrapment of air bubbles and with minimal use of solvents.

A roller applicator can have a single, split, or double configuration and can be any suitable length. The length can be selected to accommodate the dimensions to which a curable coating composition is to be applied. For example, a roller applicator can have a length from 2 inches to 12 inches (5.1 cm to 30.5 cm), from 3 inches to 10 inches (7.6 cm to 25.4 cm), or from 4 inches to 9 inches (10.2 cm to 22.9 cm). A roller applicator can have a solid core or can have a core perforated with holes and/or slits such that a sealant material can be fed into the core and out through the perforations in the core. The core can have a cylindrical shape.

A foam sheath can cover the core. The foam sheath evens the flow of the sealant material across the foam layer.

Any suitable foam material can be used. Examples of suitable foam materials include polyesters, polyurethanes, and combinations thereof.

A foam sheath can have a nap thickness, for example, from 0.1 inches to 0.5 inches (2.54 mm to 12.7 mm), such as from 0.125 inches to 0.4 inches (3.18 mm to 10.16 mm), or from 0.15 inches to 0.3 inches (3.81 mm to 7.62 mm).

The foam sheath can have foam density, for example, from 1.5 lb/ft$^3$ to 5 lb/ft$^3$ (24.0 kg/m$^3$ to 80.1 kg/m$^3$), such as from 2.0 lb/ft$^3$ to 4 lb/ft$^3$ (32.0 kg/m$^3$ to 64.1 kg/m$^3$), from 3.0 lb/ft$^3$ to 3.5 lb/ft$^3$ (48.6 kg/m$^3$ to 56.1 kg/m$^3$).

To apply a sealant composition to a surface, the foam sheath is first saturated with the sealant and then applied to a surface using a back-and-forth motion. The sheath can be saturated with a curable sealant composition by hand or by extruding the curable sealant composition through perforations in the foam sheath. A sealant layer having a uniform thickness and that is substantially free of defects such as bubbles can be obtained by passing the roller applicator back and forth across a section of a surface at a rate, for example, of from 1 sec to 5 sec per pass.

Applicators provided by the present disclosure can be used to apply a viscous curable coating composition such as a sealant barrier coating composition. A curable coating composition can have a viscosity, for example, from 1,000 cp to 10,000 cp (1 Pa×s to 10 Pa×s), from 1,500 cp to 8,000 cp (1.5 Pa×s to 8 Pa-s), from 2,000 cp to 6,000 cp (2 Pa×s to 6 Pa×s), or from 2,500 cp to 4,000 cp (2.5 Pa×s to 4 Pa×s).

An applicator provided by the present disclosure can be used to apply curable coating compositions having a long pot life. The pot life refers to the time from when coreactive components of a composition are first mixed until the time the curable composition is no longer workable such that the curable composition cannot be applied to a substrate surface.

Curable coating compositions that do not have a long pot life may be used, however, additional consideration needs to be given to the potential that the viscosity of the composition can change during the application process thereby complicating the ability to apply the curable sealant composition through the applicator.

A curable coating composition having a long pot life can have a pot life, for example, greater than 2 hours, greater than 4 hours, greater than 6 hours, or greater than 8 hours. A curable coating composition having a long pot life can have a pot life, for example, from 2 hours to 12 hours, from 2 hours to 12 hours, from 2 hours to 10 hours, or from 2 hours to 8 hours.

Examples of curable coating compositions having a long pot life include cure-on-demand systems. A cure-on-demand system refers to a sealant composition that either includes reactants having a slow intrinsic reaction rate and a latent catalyst, or reactants having a fast, intrinsic reaction rate in which at least one of the reactants is latent.

The reactants and catalysts in cure-on-demand systems can be combined and stored, for example, for weeks or months, as one-part systems.

Cure-on-demand systems include coating compositions having a latent catalyst, compositions that are curable using actinic radiation such as ultraviolet-curable systems, coating compositions having latent reactants or blocked reactants such as moisture-curable coating compositions, and compositions including an encapsulated catalyst.

Curable coating compositions can comprise, for example, a filler, a catalyst, a rheology control agent, a reactive diluent, or a combination of any of the foregoing. A curable coating composition can comprise, for example, from 1 wt % to 90 wt % of a filler or a combination of filler, where wt % is based on the total weight of the coating composition. A curable coating composition can comprise, for example, from 1 vol % to 90 vol % of a filler or a combination of filler, where vol % is based on the total weight of the coating composition.

An applicator can include one or more devices for initiating a curing reaction. For example, for thermally cured systems, the nozzle outlet can be heated. Alternatively, heat can be applied to the extruded sealant material after it is applied to a surface such as, for example, using a radiant heat source or through absorption of radiation such as infrared radiation.

For radical cured chemistries, actinic radiation can be applied during and/or after the material is being extruded from the applicator slit. Examples of actinic radiation include for example, includes α-rays, γ-rays, X-rays, ultraviolet (UV) light including UVA, UVA, and UVC spectra), visible light, blue light, infrared, near-infrared, or an electron beam.

An applicator provided by the present disclosure can comprise an integrated curing apparatus or can be used in conjunction with a curing apparatus. A curing apparatus can be an apparatus that initiates a curing reaction of the cure-on-demand sealant composition. A curing apparatus can comprise and an energy source where energy from the energy source can initiate the curing reaction. The energy can be applied to the curable coating composition, for example, while the curable coating composition is passing through one or more of the sections of the applicator, while the curable coating composition is passing through the nozzle outlet and is being applied to a substrate surface, and/or after the curable coating composition has been applied to a substrate surface. The energy can comprise, for example, actinic radiation, thermal energy, acoustic energy, mechanical energy, microwave energy, infrared radiation, or a combination of any of the foregoing.

In operation, an applicator is intended to be held against the surface of a part and drawn across the surface by hand. However, fully automated drawing methods are also possible.

An applicator provided by the present disclosure can be used to apply a coating layer having a thickness, for example, from 0.1 mm to 10 mm, from 0.2 mm to 8 mm, from 0.3 mm to 6 mm, from 0.4 mm to 4 mm, from 0.5 mm to 3 mm, or from 1 mm to 2 mm. An applicator provided by the present disclosure can be used to apply a coating layer having a thickness, for example greater than 0.1 mm, greater than 0.5 mm, greater than 1 mm, greater than 2 mm, greater than 4 mm, or greater than 6 mm. Applicators provided by the present disclosure can be used to apply a coating layer having a thickness, for example, less than 10 mm, less than 8 mm, less than 6 mm, less than 4 mm, less than 2 mm, or less than 1 mm.

An extrusion applicator provided by the present disclosure can be configured to provide an extrusion comprising a single composition.

An extrusion applicator provided by the present disclosure can also be configured to provide a coextrusion. A coextrusion can include sealant layers of having different compositions.

Thus, an extrusion applicator provided by the present disclosure can be used to apply a single layer coating, or a multiple layer coating such as a coating having from 1 to 4 layers, such as 1 layer, 2 layers, 3 layers, or 4 layers.

A multilayer coating can comprise, for example, an adhesive layer, a protective layer, a pigment layer, an electrically conductive layer, and an outer aesthetic layer.

The multiple materials for providing a multilayer coating can be pumped into the inlet of the applicator, into the transition section, and/or into the nozzle section. Any suitable pump can be used such as syringe pump, a peristaltic pump, or a progressive cavity pump.

The multiple compositions can have different viscosities.

The multiple layers can have different thicknesses. For example, a center layer can provide mechanical properties and solvent resistant properties; a lower or interior layer can facilitate adhesion of the multilayer coating to a substrate, and an outer or exterior layer can provide desired aesthetic qualities.

An extrusion applicator can be fabricated using any suitable method such as, for example, additive manufacturing, injection molding, insert molding, metal casting, or other fabrication method.

At least some of the sections, or portions of the sections can be made from different materials. For example, the transition section can be made from a high modulus material to provide structural strength to the applicator. The nozzle portion, or at least the nozzle portion proximate the outlet slit can comprise a low modulus material designed to facilitate the ability of the nozzle to accommodate non-planar surfaces.

An applicator provided by the present disclosure can be used to apply sealants such as aerospace sealants. A barrier coating refers to a sealant layer that is applied over a thicker layer and serves as a secondary solvent resistant layer. Examples of aerospace barrier coatings are disclosed in U.S. Application Publication No. 2019/169465 A1. A barrier coating can comprise, for example, a thiol-terminated prepolymer and an alkenyl-terminated urethane-containing prepolymer and/or an alkenyl-terminated urea-containing prepolymer. A barrier coating can be a UV curable barrier sealant coating.

A coating composition can be a sealant composition such as an aerospace sealant composition.

An aerospace sealant composition can comprise a sulfur-containing prepolymer or a combination of sulfur-containing polymer.

A sulfur-containing prepolymer refers to a prepolymer that has one or more thioether —$S_n$— groups, where n can be, for example, 1 to 6, in the backbone of the prepolymer. Prepolymers that contain only thiol or other sulfur-containing groups either as terminal groups or as pendent groups of the prepolymer are not encompassed by sulfur-containing prepolymers. The prepolymer backbone refers to the portion of the prepolymer having repeating segments. Thus, a prepolymer having the structure of HS—R—R(—$CH_2$—SH)—[—R—$(CH_2)_2$—$S(O)_2$—$(CH_2)$—$S(O)_2]_n$—CH═$CH_2$ where each R is a moiety that does not contain a sulfur atom, is not encompassed by a sulfur-containing prepolymer. A prepolymer having the structure HS—R—R(—$CH_2$—SH)—[—R—$(CH_2)_2$—$S(O)_2$—$(CH_2)$—$S(O)_2$]—CH═$CH_2$ where at least one R is a moiety that contains a sulfur atom, such as a thioether group, is encompassed by a sulfur-containing prepolymer.

Sulfur-containing prepolymers can impart chemical resistance to a cured sealant.

Prepolymer backbones that exhibit chemical resistance can have a high sulfur content. For example, a sulfur-containing prepolymer backbone can have a sulfur content greater than 10 wt %, greater than 12 wt %, greater than 15 wt %, greater than 18 wt %, greater than 20 wt %, or greater than 25 wt %, where wt % is based on the total weight of the prepolymer backbone. A chemically resistant prepolymer backbone can have a sulfur content, for example, from 10 wt % to 25 wt %, from 12 wt % to 23 wt %, from 13 wt % to 20 wt %, or from 14 wt % to 18 wt %, where wt % is based on the total weight of the prepolymer backbone.

A sealant composition can comprise, for example, from 40 wt % to 80 wt %, from 40 wt % to 75 wt %, from 45 wt % to 70 wt %, or from 50 wt % to 70 wt % of a sulfur-containing prepolymer or combination of sulfur-containing prepolymers, where wt % is based on the total weight of the sealant composition. A sealant composition can comprise, for example, greater than 40 wt %, greater than 50 wt %, greater than 60 wt %, greater than 70 wt %, greater than 80 wt %, or greater than 90 wt % of a sulfur-containing prepolymer or combination of sulfur-containing prepolymer, where wt % is based on the total weight of the sealant composition. A sealant composition can comprise, for example, less than 90 wt %, less than 80 wt %, less than 70 wt %, less than 60 wt %, less than 50 wt %, or less than 40 wt % of a sulfur-containing prepolymer or combination of sulfur-containing prepolymers, where wt % is based on the total weight of the sealant composition.

Examples of prepolymers having a sulfur-containing backbone include polythioether prepolymers, polysulfide prepolymers, sulfur-containing polyformal prepolymers, monosulfide prepolymers, and a combination of any of the foregoing.

A prepolymer can comprise a polythioether prepolymer or a combination of polythioether prepolymers.

A polythioether prepolymer can comprise a polythioether prepolymer comprising at least one moiety having the structure of Formula (1), a thiol-terminated polythioether prepolymer of Formula (1a), a terminal-modified polythioether of Formula (1b), or a combination of any of the foregoing:

$$—S—R^1—[S\text{-}A\text{-}S—R^1—]_n—S— \quad (1)$$

$$HS—R^1—[S\text{-}A\text{-}S—R^1—]_n—SH \quad (1a)$$

$$R^3—S—R^1—[S\text{-}A\text{-}S—R^1—]_n—S—R^3 \quad (1b)$$

wherein, n can be an integer from 1 to 60;

each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and —$[(CHR)_p—X—]_q(CHR)_r$—, where, p can be an integer from 2 to 6;

q can be an integer from 1 to 5;

r can be an integer from 2 to 10;

each R can independently be selected from hydrogen and methyl; and each X can independently be selected from O, S, and S—S; and each A can independently be a moiety derived from a polyvinyl ether of Formula (2) or a polyalkenyl polyfunctionalizing agent of Formula (3):

$$CH_2═CH—O—(R^2—O)_m—CH═CH_2 \quad (2)$$

$$B(—R^4—CH═CH_2)_z \quad (3)$$

wherein, m can be an integer from 0 to 50;

each $R^2$ can independently be selected from $C_{1-10}$ alkanediyl, $C_{6-8}$ cycloalkanediyl, $C_{6-14}$ alkanecycloalkanediyl, and —$[(CHR)_p—X\text{-}]_q(CHR)_r$—, wherein p, q, r, R, and X are as defined as for $R^1$;

each $R^3$ can independently be moiety comprising a terminal reactive group;

B represents a core of a z-valent, polyalkenyl polyfunctionalizing agent $B(—R^4—CH═CH_2)_z$ wherein, z can be an integer from 3 to 6; and each $R^4$ can independently be selected from $C_{1-10}$ alkanediyl, $C_{1-10}$ heteroalkanediyl, substituted $C_{1-10}$ alkanediyl, and substituted $C_{1-10}$ heteroalkanediyl.

In moieties of Formula (1) and prepolymers of Formula (1a)-(1b), each A can independently be selected from a moiety of Formula (2a) and a moiety of Formula (3a):

$$—(CH_2)_2—O—(R^2—O)_m—(CH_2)_2— \quad (2a)$$

$$B\{—R^4—(CH_2)_2—\}_2\{—R^4—(CH_2)_2—S—[—R^1—S\text{-}A\text{-}S—R^1—]_n—SH\}_{z-2} \quad (3a)$$

where m, $R^1$, $R^2$, $R^4$, A, B, m, n, and z are defined as in Formula (1), Formula (2), or Formula (3).

Methods of synthesizing sulfur-containing polythioethers are disclosed, for example, in U.S. Pat. No. 6,172,179.

The backbone of a thiol-terminated polythioether prepolymer can be modified to improve the properties such as adhesion, tensile strength, elongation, UV resistance, hardness, and/or flexibility of sealants and coatings prepared using polythioether prepolymers. For example, adhesion promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540, 540 (sulfone-containing), U.S. Pat. No. 8,952,124 (bis(sulfonyl)alkanol-containing), U.S. Pat. No. 9,382,642 (metal-ligand containing), U.S. Application Publication No. 2017/0114208 (antioxidant-containing), PCT International Publication No. WO 2018/085650 (sulfur-containing divinyl ether), and PCT International Publication No. WO 2018/031532 (urethane-containing). Polythioether prepolymers include prepolymers described in U.S. Application Publication Nos. 2017/0369737 and 2016/0090507.

Examples of suitable thiol-terminated polythioether prepolymers are disclosed, for example, in U.S. Pat. No. 6,172,179. A thiol-terminated polythioether prepolymer can comprise Permapol® P3.1E, Permapol® P3.1E-2.8, Permapol® L56086, or a combination of any of the foregoing, each of which is available from PPG Aerospace. These Permapol® products are encompassed by the thiol-terminated polythioether prepolymers of Formula (2), (2a), and (2b). Thiol-terminated polythioethers include prepolymers described in U.S. Pat. No. 7,390,859 and urethane-containing polythiols described in U.S. Application Publication Nos. 2017/0369757 and 2016/0090507.

A sulfur-containing prepolymer can comprise a polysulfide prepolymer or a combination of polysulfide prepolymers.

A polysulfide prepolymer refers to a prepolymer that contains one or more polysulfide linkages, i.e., —$S_x$-linkages, where x is from 2 to 4, in the prepolymer backbone. A polysulfide prepolymer can have two or more sulfur-sulfur linkages. Suitable thiol-terminated polysulfide prepolymers are commercially available, for example, from AkzoNobel and Toray Industries, Inc. under the tradenames Thioplast® and from Thiokol-LP®, respectively.

Examples of suitable polysulfide prepolymers are disclosed, for example, in U.S. Pat. Nos. 4,623,711; 6,172,179; 6,509,418; 7,009,032; and 7,879,955.

Examples of suitable thiol-terminated polysulfide prepolymers include Thioplast® G polysulfides such as Thioplast® G1, Thioplast® G4, Thioplast® G10, Thioplast® G12, Thioplast® G21, Thioplast® G22, Thioplast® G44, Thioplast® G122, and Thioplast® G131, which are commercially available from AkzoNobel. Thioplast® G resins are liquid thiol-terminated polysulfide prepolymers that are blends of di- and tri-functional molecules where the difunctional thiol-terminated polysulfide prepolymers have the structure of Formula (4) and the trifunctional thiol-terminated polysulfide polymers can have the structure of Formula (5):

$$\text{HS—(—R}^5\text{—S—S—)}_d\text{—R}^5\text{—SH} \quad (4)$$

$$\text{HS—(—R}^5\text{—S—S—)}_a\text{—CH}_2\text{—CH\{—CH}_2\text{—(—S—S—R}^5\text{—)}_b\text{—SH\}\{—(—S—S—R}^5\text{—)}_c\text{—SH\}} \quad (5)$$

where each $R^5$ is —$(CH_2)_2$—O—$CH_2$—O—$(CH_2)_2$—, and d=a+b+c, where the value for d may be from 7 to 38 depending on the amount of the trifunctional cross-linking agent (1,2,3-trichloropropane; TCP) used during synthesis of the polysulfide prepolymer. Thioplast® G polysulfides can have a number average molecular weight from less than 1,000 Da to 6,500 Da, an SH content from 1% to greater than 5.5%, and a cross-linking density from 0% to 2.0%.

Polysulfide prepolymers can further comprise a terminal-modified polysulfide prepolymer having the structure of Formula (4a), a terminal modified polysulfide prepolymer having the structure of Formula (5a), or a combination thereof:

$$\text{R}^3\text{—S—(—R}^5\text{—S—S—)}_d\text{—R—S—R}^3 \quad (4a)$$

$$\text{R}^3\text{—S—(—R}^5\text{—S—S—)}_a\text{—CH}_2\text{—CH\{—CH}_2\text{—(—S—S—R}^5\text{—)}_b\text{—S—H—(—S—S—R}^5\text{—)}_c\text{—S—R}^3\text{\}} \quad (5a)$$

where d, a, b, c, and $R^5$ are defined as for Formula (4) and Formula (5), and $R^3$ is a moiety comprising a terminal reactive group.

Examples of suitable thiol-terminated polysulfide prepolymers also include Thiokol® LP polysulfides available from Toray Industries, Inc. such as Thiokol® LP2, Thiokol® LP3, Thiokol™ LP12, Thiokol® LP23, Thiokol® LP33, and Thiokol® LP55. Thiokol® LP polysulfides have a number average molecular weight from 1,000 Da to 7,500 Da, a —SH content from 0.8% to 7.7%, and a cross-linking density from 0% to 2%. Thiokol™ LP polysulfide prepolymers have the structure of Formula (6) and terminal-modified polysulfide prepolymers can have the structure of Formula (6a):

$$\text{HS—[(CH}_2\text{)}_2\text{—O—CH}_2\text{—O—(CH}_2\text{)}_2\text{—S—S—]}_e\text{—(CH}_2\text{)}_2\text{—O—CH}_2\text{—O—(CH}_2\text{)}_2\text{—SH} \quad (6)$$

$$\text{R}^3\text{—S—[(CH}_2\text{)}_2\text{—O—CH}_2\text{—O—(CH}_2\text{)}_2\text{—S—S—]}_e\text{—(CH}_2\text{)}_2\text{—O—CH}_2\text{—O—(CH}_2\text{)}_2\text{—S—R}^3 \quad (6a)$$

where e can be such that the number average molecular weight from 1,000 Da to 7,500 Da, such as, for example an integer from 8 to 80, and each $R^3$ is a moiety comprising a terminal reactive functional group.

A thiol-terminated sulfur-containing prepolymer can comprise a Thiokol-LP® polysulfide, a Thioplast® G polysulfide, or a combination thereof.

Examples of thiol-terminated polysulfide prepolymers of Formula (6a) and (6b) are disclosed, for example, in U.S. Application Publication No. 2016/0152775, in U.S. Pat. No. 9,079,833, and in U.S. Pat. No. 9,663,619.

A polysulfide prepolymer can comprise a polysulfide prepolymer comprising a moiety of Formula (7), a thiol-terminated polysulfide prepolymer of Formula (7a), a terminal-modified polysulfide prepolymer of Formula (7b), or a combination of any of the foregoing:

$$\text{—(R}^6\text{—O—CH}_2\text{—O—R}^6\text{—S}_m\text{—)}_{n-1}\text{—R}^6\text{—O—CH}_2\text{—O—R}^6\text{—} \quad (7)$$

$$\text{HS—(R}^6\text{—O—CH}_2\text{—O—R}^6\text{—S}_m\text{—)}_{n-1}\text{—R}^6\text{—O—CH}_2\text{—O—R}^6\text{—SH} \quad (7a)$$

$$\text{R}^3\text{—S—(R}^6\text{—O—CH}_2\text{—O—R}^6\text{—S}_m\text{—)}_{n-1}\text{—R}^6\text{—O—CH}_2\text{—O—R—S—R}^3 \quad (7b)$$

where $R^6$ is $C_{2-4}$ alkanediyl, m is an integer from 1 to 8, and n is an integer from 2 to 370; and each $R^3$ is independently a moiety comprising a terminal reactive functional group.

Polysulfide prepolymers of Formula (7) and polysulfide prepolymers of Formula (7a)-(7b), are disclosed, for example, in JP 62-53354.

A sulfur-containing prepolymer can comprise a sulfur-containing polyformal prepolymer or a combination of sulfur-containing polyformal prepolymers. Sulfur-containing polyformal prepolymers useful in sealant applications are disclosed, for example, in U.S. Pat. No. 8,729,216 and in U.S. Pat. No. 8,541,513.

A sulfur-containing polyformal prepolymer can comprise a moiety of Formula (8), a thiol-terminated sulfur-containing polyformal prepolymer of Formula (8a), a terminal-modified sulfur-containing polyformal prepolymer of Formula (8b), a thiol-terminated sulfur-containing polyformal prepolymer of Formula (8c), a terminal-modified sulfur-containing polyformal prepolymer of Formula (8d), or a combination of any of the foregoing:

$$—R^8—(S)_v—R^8—[O—C(R^2)_2—O—R^8—(S)_v—R^1—]_n— \quad (8)$$

$$R^{10}—R^8—(S)_v—R^8—[O—C(R^9)_2—O—R^8—(S)_v—R^8—]_h—R^{10} \quad (8a)$$

$$R^3—R^8—(S)_v—R^8—[O—C(R^9)_2—O—R^8—(S)_v—R^8—]_h—R^3 \quad (8b)$$

$$\{R^{10}—R^8—(S)_v—R^8—[O—C(R^9)_2—O—R^8—(S)_v—R^8—]_n—O—C(R^9)_2—O—\}_mZ \quad (8c)$$

$$\{R^3—R^8—(S)_v—R^8—[O—C(R^9)_2—O—R^8—(S)_v—R^8—]_n—O—C(R^9)_2—O—\}_mZ \quad (8d)$$

where h can be an integer from 1 to 50; each v can independently be selected from 1 and 2; each $R^8$ can be $C_{2-6}$ alkanediyl; and each $R^9$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; each $R^{10}$ is a moiety comprising a terminal thiol group; and each $R^3$ is independently a moiety comprising a terminal reactive functional group other than a thiol group; and Z can be derived from the core of an m-valent parent polyol $Z(OH)_m$.

A sulfur-containing prepolymer can comprise a monosulfide prepolymer or a combination of monosulfide prepolymers.

A monosulfide prepolymer can comprise a moiety of Formula (9), a thiol-terminated monosulfide prepolymer of Formula (9a), a thiol-terminated monosulfide prepolymer of Formula (9b), a terminal-modified monosulfide prepolymer of Formula (9c), a terminal-modified monosulfide prepolymer of Formula (9d), or a combination of any of the foregoing:

$$—S—R^{13}—[—S—(R^{11}—X)_w—(R^{12}—X)_u—R^{13}—]_x—S— \quad (9)$$

$$HS—R^{13}—[—S—(R^{11}—X)_w—(R^{12}—X)_u—R^{13}—]_x—SH \quad (9a)$$

$$\{HS—R^{13}—[—S—(R^{11}—X)_w—(R^{12}—X)_u—R^{13}—]_x—S—V'—\}_zB \quad (9b)$$

$$R^3—S—R^{13}—[—S—(R^{11}—X)_w—(R^{12}—X)_u—R^{13}—]_x—S—R^3 \quad (9c)$$

$$\{R^3—S—R^{13}—[—S—(R^{11}—X)_u—(R^{12}—X)_q—R^{13}—]_x—S—V'—\}_zB \quad (9d)$$

wherein, each $R^{11}$ can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^{12}$ can independently be selected from hydrogen, $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;

each $R^{13}$ can independently be selected from hydrogen, $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;

each X can independently be selected from O and S;

w can be an integer from 1 to 5;

u can be an integer from 0 to 5; and x can be an integer from 1 to 60, such as from 2 to 60, from 3 to 60, or from 25 to 35;

each $R^3$ is independently selected from a reactive functional group;

B represents a core of a z-valent polyfunctionalizing agent $B(—V)_z$ wherein:

z can be an integer from 3 to 6; and each V can be a moiety comprising a terminal group reactive with a thiol group;

each —V'—can be derived from the reaction of —V with a thiol.

Methods of synthesizing thiol-terminated monosulfide comprising moieties of Formula (10) or prepolymers of Formula (9b)-(9c) are disclosed, for example, in U.S. Pat. No. 7,875,666.

A monosulfide prepolymer can comprise a moiety of Formula (10), a thiol-terminated monosulfide prepolymer comprising a moiety of Formula (10a), comprise a thiol-terminated monosulfide prepolymer of Formula (10b), a thiol-terminated monosulfide prepolymer of Formula (10c), a thiol-terminated monosulfide prepolymer of Formula (10d), or a combination of any of the foregoing:

$$—[—S—(R^{14}—X)_w—C(R^{15})_2—(X—R^{14})_u—]_x—S— \quad (10)$$

$$H—[—S—(R^{14}—X)_w—C(R^{15})_2—(X—R^{14})_u—]_x—SH \quad (10a)$$

$$R^3—[—S—(R^{14}—X)_w—C(R^{15})_2—(X—R^{14})_u—]_x—S—R^3 \quad (10b)$$

$$\{H—[—S—(R^{14}—X)_w—C(R^{15})_2—(X—R^{14})_u—]_x—S—V'—\}_zB \quad (10c)$$

$$\{R^3—[—S—(R^{14}—X)_w—C(R^{15})_2—(X—R^{14})_u—]_x—S—V'—\}_zB \quad (10d)$$

wherein, each $R^{14}$ can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{8-10}$ alkylarenediyl;

each $R^{15}$ can independently be selected from hydrogen, $C_{1-10}$ n-alkanediyl, such as a $C_{1-6}$ n-alkanediyl, $C_{3-10}$ branched alkanediyl, such as a $C_{3-6}$ branched alkanediyl having one or more pendant groups which can be, for example, alkyl groups, such as methyl or ethyl groups; a $C_{6-8}$ cycloalkanediyl group; a $C_{6-14}$ alkylcycloalkanediyl, such as a $C_{6-10}$ alkylcycloalkanediyl; and a $C_{8-10}$ alkylarenediyl;

each X can independently be selected from O and S;

w can be an integer from 1 to 5;

u can be an integer from 1 to 5;

x can be an integer from 1 to 60, such as from 2 to 60, from 3 to 60, or from 25 to 35;

each $R^6$ is a moiety comprising a terminal functional group;

B represents a core of a z-valent polyfunctionalizing agent $B(—V)_z$ wherein:

z can be an integer from 3 to 6; and each V can be a moiety comprising a terminal group reactive with a thiol group;

each —V'—can be derived from the reaction of —V with a thiol.

Methods of synthesizing monosulfides of Formula (10)-(10d) are disclosed, for example, in U.S. Pat. No. 8,466,220.

Examples of other chemically resistant prepolymers include polytetrafluorethylene, polyvinylidene difluoride, polyethylenetetrafluoroethylene, fluorinated ethylene propylene, perfluoroalkoxy, ethylene chlorotrifluorethylene, polychlorotrifluoroethylene, fluorinated ethylene propylene polymers polyamide, polyethylene, polypropylene, ethylene-propylene, fluorinated ethylene-propylene, polysulfone, polyarylether sulfone, polyether sulfone, polyimide, polyethylene terephthalate, polyetherketone, polyetherether ketone, polyetherimide, polyphenylene sulfide, polyarylsulfone, polybenzimidazole, polyamideimide, liquid crystal polymers, or combinations of any of the foregoing.

An applicator provided by the present disclosure can be used to apply sealants such as aerospace sealants. A sealant composition refers to a composition that is capable of producing a cured material that has the ability to resist atmospheric conditions, such as moisture and temperature and at least partially block the transmission of materials, such as water, fuel, and other liquid and gasses.

An aerospace sealant provided by the present disclosure can be formulated as Class A, Class B, or Class C sealants. A Class A sealant refers to a brushable sealant having a viscosity of 1 poise to 500 poise (0.1 Pa-sec to 50 Pa-sec) and is designed for brush application. A Class B sealant refers to an extrudable sealant having a viscosity from 4,500 poise to 20,000 poise (450 Pa-sec to 2,000 Pa-sec), and is designed for application by extrusion via a pneumatic gun. A Class B sealant can be used to form fillets and sealing on vertical surfaces or edges where low slump/slag is required. A Class C sealant has a viscosity from 500 poise to 4,500 poise (50 Pa-sec to 450 Pa-sec) and is designed for application by a roller or combed tooth spreader. A Class C sealant can be used for fay surface sealing. Viscosity can be measured according to Section 5.3 of SAE Aerospace Standard AS5127/1C published by SAE International Group.

An aerospace sealant can exhibit properties acceptable for use in aerospace sealant applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B. It is also desirable that, when cured, compositions provided by the present disclosure used in aviation and aircraft applications exhibit a percent volume swell not greater than 25% following immersion for one week at 60° C. (140° F.) at 760 torr (101 kPa) in Jet Reference Fluid (JRF) Type 1. Other properties, ranges, and/or thresholds may be appropriate for other sealant applications.

Chemical resistance of a sealant can be with respect to cleaning solvents, fuels, hydraulic fluids, lubricants, oils, and/or salt spray. Chemical resistance refers to the ability of a part to maintain acceptable physical and mechanical properties following exposure to atmospheric conditions such as moisture and temperature and following exposure to chemicals such as cleaning solvents, fuels, hydraulic fluid, lubricants, and/or oils. In general, a chemically resistant sealant can exhibit a % swell less than 25%, less than 20%, less than 15%, or less than 10%, following immersion in a chemical for 7 days at 70° C., where % swell is determined according to EN ISO 10563.

A sealant useful for aerospace applications can be fuel resistant. Fuel resistant with respect to aerospace sealant applications means that a composition, when applied to a substrate and cured, can provide a cured product, such as a sealant, that exhibits a percent volume swell of not greater than 40%, in some cases not greater than 25%, in some cases not greater than 20%, and in other cases not more than 10%, after immersion for one week at 140° F. (60° C.) and 760 torr (101 kPa) in JRF Type I according to methods similar to those described in ASTM D792 (American Society for Testing and Materials) or AMS 3269 (Aerospace Material Specification). JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1, available from SAE (Society of Automotive Engineers)).

Following exposure to Jet Reference Fluid (JRF Type 1) according to ISO 1817 for 168 hours at 60° C., a cured sealant can exhibit a tensile strength greater than 1.4 MPa determined according to ISO 37, a tensile elongation greater than 150% determined according to ISO 37, and a hardness greater than Shore 30A determined according to ISO 868, where the tests are performed at a temperature of 23° C., and a humidity of 55% RH.

Following exposure to de-icing fluid according to ISO 11075 Type 1 for 168 hours at 60° C., a cured sealant can exhibit a tensile strength greater than 1 MPa determined according to ISO 37, and a tensile elongation greater than 150% determined according to ISO 37, where the tests are performed at a temperature of 23° C., and a humidity of 55% RH.

Following exposure to phosphate ester hydraulic fluid (Skydrol® LD-4) for 1,000 hours at 70° C., a cured sealant can exhibit a tensile strength greater than 1 MPa determined according to ISO 37, a tensile elongation greater than 150% determined according to ISO 37, and a hardness greater than Shore 30A determined according to ISO 868, where the tests are performed at a temperature of 23° C., and a humidity of 55% RH. A chemically resistant composition can exhibit a % swell less than 25%, less than 20%, less than 15%, or less than 10%, following immersion in a chemical for 7 days at 70° C., where % swell is determined according to EN ISO 10563.

A cured coating can exhibit a hardness, for example, greater than Shore 20A, greater than Shore 30A, greater than Shore 40A, greater than Shore 50A, or greater than Shore 60A, where hardness is determined according to ISO 868 at 23° C./55% RH.

A cured coating can exhibit a tensile elongation of at least 200% and a tensile strength of at least 200 psi when measured in accordance with the procedure described in AMS 3279, § 3.3.17.1, test procedure AS5127/1, § 7.7.

A cured coating can exhibit a lap shear strength of greater than 200 psi (1.38 MPa), such as at least 220 psi (1.52 MPa), at least 250 psi (1.72 MPa), and, in some cases, at least 400 psi (2.76 MPa), when measured according to the procedure described in SAE AS5127/1 paragraph 7.8.

A cured coating can meet or exceed the requirements for aerospace sealants as set forth in AMS 3277.

Aerospace sealants are thermoset compositions that contain two or more co-reactive components. Various curing chemistries can be used such as thiol/alkenyl, thiol/epoxy, thiol/Michael acceptor, isocyanate/hydroxyl, and isocyanate/amine.

Applicators provided by the present disclosure can be used to applied coatings of a viscous composition having a cured thickness, for example, from 5 mils to 40 mils (127 μm to 508 μm), such as from 5 mils to 35 mils, from 5 mils to 30 mils, or from 10 mils to 30 mils.

Applicators provided by the present disclosure can be sued to apply coating compositions such as sealant compositions having a viscosity, for example, from 100 cps to 10,000 cp, or from 500 cp to 5,000 cp, as determined using a Brookfield CAP 2000 viscometer, with a No. 6 spindle, at speed of 300 rpm, and a temperature of 25° C. Applicators provided by the present disclosure can be sued to apply coating compositions such as sealant compositions having a viscosity, for example, greater than 100 cp, greater than 500 cp, greater than 1,000 cp, greater than 2,500 cp, greater than 5,000 cp, greater than 7,500 cp, or greater than 10,000 cp, as determined using a Brookfield CAP 2000 viscometer, with a No. 6 spindle, at speed of 300 rpm, and a temperature of 25° C.

An applicator provided by the present disclosure can be used to apply a coating composition that is substantially free of solvent, such as composition having less than 5 wt % solvent, less than 2 wt % solvent, less than 1 wt % solvent, or less than 0.1 wt %, solvent, where wt % is based on the total weight of the composition.

An applicator provided by the present disclosure can also be used to apply two-part sealant systems.

In a two-part system, the two reactive components begin to react when combined. For example, a first part of a two-part system can comprise a polythiol and a second part can comprise a compound reactive with the polythiol such as a polyalkenyl, a polyepoxide, a polyisocyanate, a polyfunctional Michael acceptor or a polythiol. One or both parts can further comprise a catalyst.

For use with an applicator provided by the present disclosure the first and second parts can be combined and mixed before being pumped into the applicator and/or can be combined and mixed using a mixer positioned just before the applicator inlet. Examples of suitable mixers include static mixers and dynamic mixers.

Aerospace sealants are designed to maintain their mechanical properties following exposure to solvents such as fuels and hydraulic fluids. Solvent resistant sealants can contain prepolymers having a sulfur content, for example, greater than 5 wt %, greater than 10 wt %, or greater than 15 wt %, wherein wt % is based on the wt % of the prepolymer. Examples of suitable sulfur-containing prepolymers include polythioethers, polysulfides, monosulfides, and sulfur-containing polyformals.

One of the objectives of applying a coating by using extrusion or roller coating is to avoid incorporating air into the curable composition during application as can occur during spray coating. Before applying a coating composition using an applicator provided by the present disclosure the coating composition can be degassed under vacuum to remove incorporated air. All supply connections and the applicator housing can be sealed to prevent air from being incorporated into the coating composition during application.

An applicator provided by the present disclosure can be used to apply a coating onto any suitable substrate. For example, a substrate can be an untreated or treated metal or metal-alloy substrate, such as an aluminum, aluminum alloy, steel, or steel alloy substrate. A substrate can be a polymeric substrate such as a thermoplastic polymer substrate or a thermoset polymer substrate. A coating can be applied onto an underlying layer such as a primer coating or a sealant layer.

An applicator provided by the present disclosure can be used to apply a coating to any suitable part. Examples of suitable parts include vehicle parts, architectural parts, construction parts, electronic parts, furniture, medical devices, portable devices, telecommunications devices, athletic equipment, apparel, and toys.

Parts such as vehicle parts include automotive vehicle parts and aerospace vehicle parts.

An applicator provided by the present disclosure can be used to coat internal and external vehicle parts such as motor vehicle parts, railed vehicle parts, aerospace vehicle parts, military vehicle parts, and watercraft parts.

A vehicle part can be a new part or a replacement part.

The term "vehicle" is used in its broadest sense and includes all types of aircraft, spacecraft, watercraft, and ground vehicles. For example, a vehicle can include aircraft such as airplanes including private aircraft, and small, medium, or large commercial passenger, freight, and military aircraft; helicopters, including private, commercial, and military helicopters; aerospace vehicles including, rockets and other spacecraft. A vehicle can include a ground vehicle such as, for example, trailers, cars, trucks, buses, vans, construction vehicles, golf carts, motorcycles, bicycles, scooters, trains, and railroad cars. A vehicle can also include watercraft such as, for example, ships, boats, and hovercraft.

A vehicle part can be, for example, part for a motor vehicle, including automobile, truck, bus, van, motorcycles, scooters, and recreational motor vehicles; railed vehicles including trains and trams; bicycles; aerospace vehicles including airplanes, rockets, spacecraft, jets, and helicopters; military vehicles including jeeps, transports, combat support vehicles, personnel carriers, infantry fighting vehicles, mine-protected vehicles, light armored vehicles, light utility vehicles, and military trucks; and watercraft including ships, boats, and recreational watercraft.

Examples of aviation vehicles include F/A-18 jet or related aircraft such as the F/A-18E Super Hornet and F/A-18F; in the Boeing 787 Dreamliner, 737, 747, 717 passenger jet aircraft, a related aircraft (produced by Boeing Commercial Airplanes); in the V-22 Osprey; VH-92, S-92, and related aircraft (produced by NAVAIR and Sikorsky); in the G650, G600, G550, G500, G450, and related aircraft (produced by Gulfstream); and in the A350, A320, A330, and related aircraft (produced by Airbus). Methods provided by the present disclosure can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

A vehicle part can be an interior vehicle part or an exterior vehicle part.

A vehicle can comprise a motor vehicle and the motor vehicle part can comprise a hood, door, side panel, bumper, roof, wheel well, dashboard, seat, trunk, handle, floor, chassis, cabin, chassis, cargo bed, steering wheel, fuel tank, engine block, trim, bumper, and/or a battery casing.

A vehicle can comprise a railed vehicle and the railed vehicle part can comprise an engine and/or a rail car.

A vehicle can comprise an aerospace vehicle and the aerospace part can comprise a cockpit, fuselage, wing, aileron, tail, door, seat, interior panel, fuel tank, interior panel, flooring, and/or frame.

A vehicle can comprise a military vehicle and the military vehicle part can comprise a hood, door, side panel, bumper, roof, wheel well, dashboard, seat, trunk, handle, floor, chassis, cabin, chassis, cargo bed, steering wheel, fuel tank, engine block, trim, bumper, a mount, a turret, an undercarriage, and/or a battery casing.

A vehicle can comprise a watercraft and the watercraft part can comprise a hull, an engine mount, a seat, a handle, a chassis, a battery, a battery mount, a fuel tank, an interior accessory, flooring, and/or paneling.

A vehicle part coated using a primer-surfacer composition provided by the present disclosure can have properties for the intended purpose. For example, an automotive part can be designed have a light weight. An external part for military vehicle can be designed to have a high impact strength.

A part for a commercial aerospace vehicle can be designed to have a light weight and/or to be static dissipative. An external part for a military aircraft can be designed to exhibit RFI/EMI shielding properties.

An applicator provided by the present disclosure can be used to coat custom designed vehicle parts, replacement parts, upgraded parts, specialty parts, and/or high-performance parts rapidly and cost-effectively in low volume production.

A part can comprise an elastomeric article such as, for example, seals, sealants, grommets, gaskets, washers, bushings, flanges, insulation, apparel, shoe soles, boots, footwear, handles, bumpers, shock absorbers, matting, tires, supports, automotive parts, vehicle parts, aerospace parts, marine parts, athletic equipment, toys, novelty items, and casings.

An aspect of the invention includes parts comprising a coating applied using an applicator provided by the present disclosure.

EXAMPLES

Embodiments provided by the present disclosure are further illustrated by reference to the following examples, which describe methods provided by the present disclosure. It will be apparent to those skilled in the art that many modifications, both to materials, and methods, may be practiced without departing from the scope of the disclosure.

Example 1

Application of Sealant Barrier Coatings

Sealant compositions useful as aerospace barrier coatings were prepared as described in U.S. Application No. 2019/0169465 A1. A barrier coating refers to a sealant layer that is applied over a thicker layer and serves as a secondary solvent resistant layer. The sealant compositions contained a urethane-containing polythiol prepolymer, a urethane-containing polyalkenyl prepolymer, and optionally a hydroxyl-functional polythiol. The compositions containing a UV photoinitiator and were UV curable. The compositions also included inorganic filler.

The coating compositions were supplied to the extrusion applicator at a pressure of about 30 psi and applied to an aluminum panel at a nominal wet thickness of 20 mils (508 μm). The formulations had a viscosity of about 3,000 cp (3 kPa×s) as determined using a Brookfield CAP 2000 viscometer, with a No. 6 spindle, at speed of 300 rpm, and a temperature of 25° C.

The coating compositions was also applied to an aluminum panel using a roller. Material was fed into the core of the roller. The core was covered with a polyester polyurethane foam sheath having a nap thickness of either 0.125-inches or 0.250 inches (3.175 mm to 6.5 mm) and a foam density from 3.3 lb/ft$^3$ to 3.5 lb/ft$^3$ (48.6 kg/m$^3$ to 56.1 kg/m$^3$). The foam roller was first saturated with the sealant material and then applied to an aluminum substrate with a back-and-forth motion at 1 sec per pass until the desired thickness was reached and any entrapped air bubbles were no longer visually observed.

The coating compositions were also applied to an aluminum panel using a draw down bar. A portion of the coating compositions were placed on the aluminum panel between two spacers. The drawn down bar was held against the spacers and as the bar was drawn along the spacers the coating compositions were spread out to provide a layer having a uniform thickness without any air entrapment. A coating applied using the drawn down bar was considered to represent high-quality coating.

The applied coating was cured by exposing to UV radiation. For example, a typical cure condition was to expose the applied coating to a 4 W UV LED lamp with 395 nm radiation for from 30 sec to 60 sec at a high of about 18 cm above the surface.

The thickness of the cured coating was 15 mil (381 μm).

The cured coating surfaces were smooth and free of bubbles as determined by visual inspection.

The tensile strength and % elongation of the cured coatings was determined according to ASTM D412A on samples maintained at ambient conditions (25° C., 50% RH) and following exposure to 250° F. (121° C.) for 24 hrs.

TABLE 2

Tensile and Elongation properties of the materials applied with different methods.

| | Unexposed | | 24 hrs at 250° F. (121° C.) Thermal exposure | |
|---|---|---|---|---|
| Application Methods | Tensile Strength psi/MPa | Elongation % | Tensile Strength psi/MPa | Elongation % |
| Drawdown Bar | 4000/27.6 | 550 | 3000/34.5 | 400 |
| Extruder | 3200/22.1 | 510 | 2100/14.5 | 370 |
| Roller | 1800/12.4 | 460 | 1450/10.0 | 330 |

Finally, it should be noted that there are alternative ways of implementing the embodiments disclosed herein. Accordingly, the present embodiments are to be considered as illustrative and not restrictive. Furthermore, the claims are not to be limited to the details given herein and are entitled to their full scope and equivalents thereof.

What is claimed is:

1. An extrusion applicator, comprising:

(a) an adaptor section comprising a proximal end, a distal end, and an adaptor channel;

(b) a transition section mechanically coupled to the adaptor section, and comprising a proximal end and a distal end, wherein, the transition section defines an internal transition channel comprising a width and a height;

the width of the transition channel increases from the transition inlet to the transition outlet; and the height of the transition channel decreases from the transition inlet to the transition outlet; and (c) a nozzle section mechanically coupled to the transition section, and comprising:

a flow control section coupled to the transition section, wherein the flow control section comprises a plurality of parallel channels;

a pressure control section coupled to the flow control section, wherein the pressure control section comprises a channel and one or more support structures; and a nozzle outlet in the form of a rectangular slit coupled to the pressure control section.

2. The extrusion applicator of claim 1, wherein the nozzle outlet is characterized by a height and a width, wherein the height is adjustable, the width is adjustable, or both the height and the width are adjustable.

3. The extrusion applicator of claim 1, wherein the adaptor channel, the transition channel, the channel of the pressure control section, or a combination of any of the foregoing comprise walls comprising a shear-thinning coating.

4. The extrusion applicator of claim 1, wherein the nozzle section is shaped to conform to a substrate surface.

5. The extrusion applicator of claim 1, wherein at least a portion of the nozzle section is configured to conform to a substrate surface when in contact with the substrate surface.

6. The extrusion applicator of claim 1, wherein the extrusion applicator further comprises a curing apparatus, wherein the curing apparatus comprises an energy source configured to initiate a curing reaction, and wherein the energy source comprises actinic radiation, thermal energy, acoustic energy, mechanical energy, microwave energy, infrared energy, or a combination of any of the foregoing.

7. The extrusion applicator of claim 6, wherein the curing apparatus is configured to apply energy to the transition channel, the nozzle channel, or to both the transition channel and to the nozzle channel.

8. The extrusion applicator of claim 1, wherein the extrusion applicator is configured to apply a multilayer coating.

9. A system comprising the extrusion applicator of claim 1.

10. A method of coating a substrate surface, comprising:

pumping a curable coating composition into the adaptor section of the extrusion applicator of claim 1;

placing the nozzle outlet in proximity to a surface; and moving the nozzle outlet across the surface to apply the curable coating on the surface.

11. The method of claim 10, wherein the curable coating composition comprises a latent catalyst, comprises a latent reactant, free-radical generator, a moisture activated catalyst, or a moisture-activated reactant.

12. The method of claim 10, wherein the curable coating composition is characterized by a viscosity from 1,000 cp to 10,000 cp, wherein viscosity is determined using a Brookfield CAP 2000 viscometer, with a No. 6 spindle, at speed of 300 rpm, and a temperature of 25° C.

13. The method of claim 10, further comprising applying energy to the curable coating composition.

* * * * *